United States Patent Office 3,194,518
Patented July 13, 1965

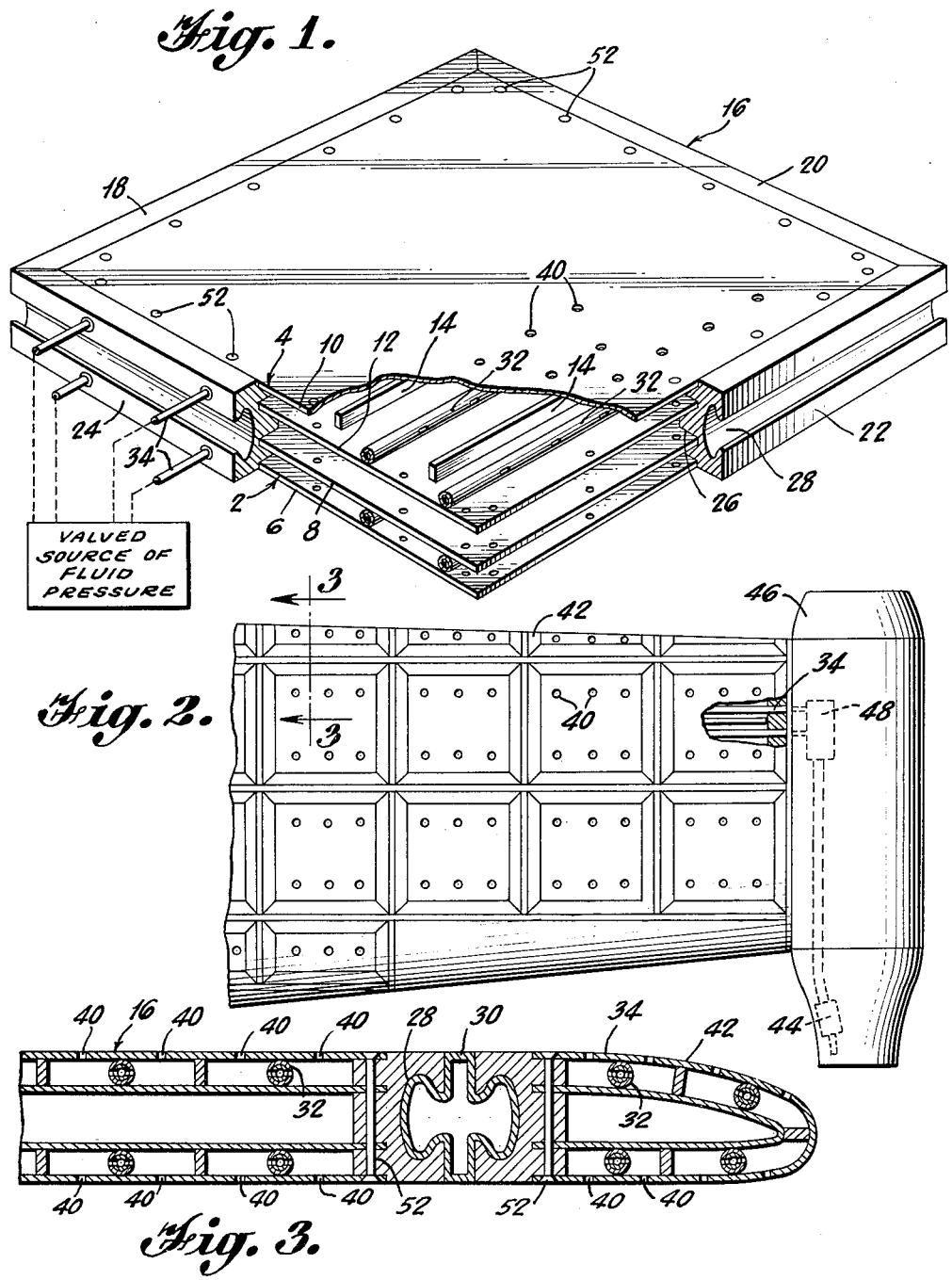

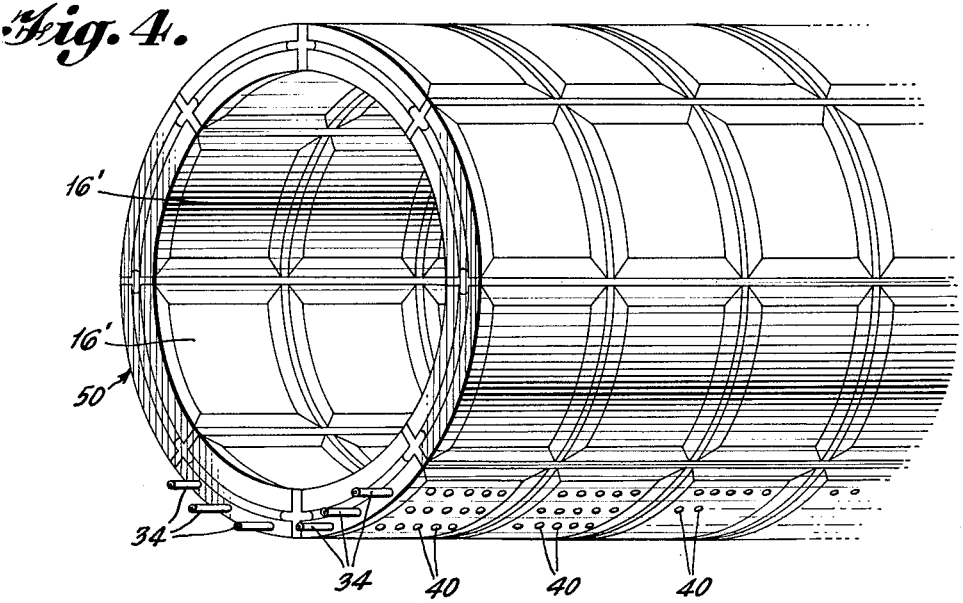
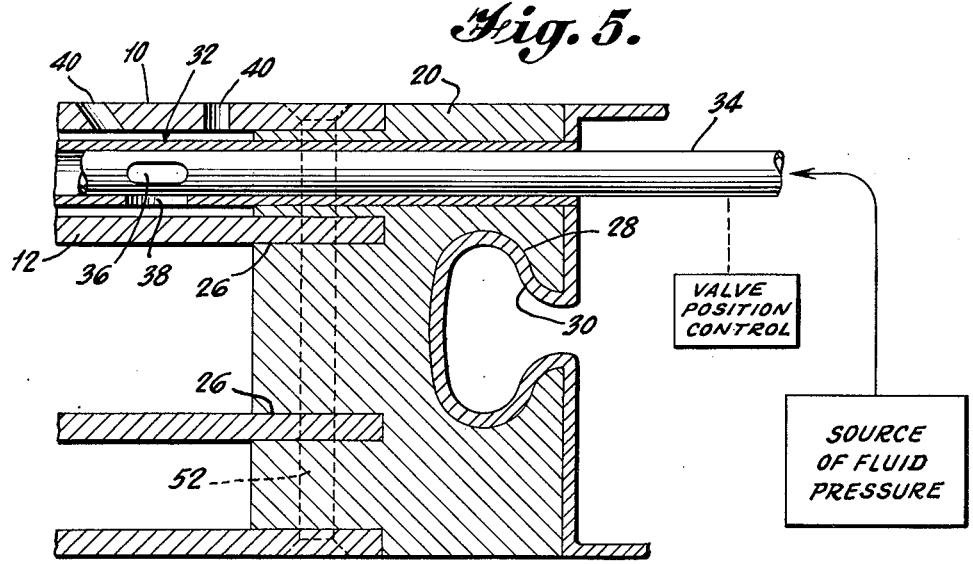

3,194,518
AIRCRAFT PANEL CONSTRUCTION FOR BOUNDARY AIR CONTROL
Robert L. Walsh, 2540 Massachusetts Ave. NW., Washington, D.C.
Filed Dec. 12, 1963, Ser. No. 330,175
10 Claims. (Cl. 244—130)

This invention relates to structure particularly adapted for aircraft or other vehicles and more particularly, structures in which boundary layer air control is advantageous.

The advantages of boundary layer air control on aircraft structures, such as wings of a fixed or rotary wing type and of fuselages, is well known, where it is important to reduce drag. Some types of missiles for special missions, particularly those that operate in the atmosphere, are aircraft in the sense that they have airfoils for sustention and a guideance system to direct them to a target but they are expendable. Present day missiles of this type are constructed with the same materials and techniques as are piloted aircraft and are therefore, unduly expensive since they require tooling for fabrication of components and assemblies comparable with that of conventional aircraft. Some missiles are broken down into major sub-assemblies, such as wing panels and fuselages. This is usually done for the purpose of transportation and assembly at a firing location. Fabricated sheet metal construction requires considerable hand labor and tooling to produce a missile sub-assembly. Forging of major portions, such as reinforced skin panels, may reduce the labor and detailed manufacturing costs but metal construction of any type requires careful storage because of the corrosion problem.

It is therefore an object of the present invention to overcome some of the above described disadvantages of missile construction by conventional aircraft tooling techniques, but providing a construction of reinforced, non-metallic panels, capable of being readily assembled into fuselages and wing structures, with the further advantage that, with additional features hereinafter described, it would be possible to accomplish boundary layer air control where such control is advantageous in the reduction of drag.

It is another object of this invention to provide a panel construction for aircraft or missile components in which the panels are prefabricated and, due to multiple use of similar panels, tooling costs are reduced.

It is another object to provide a construction technique for missiles, aircraft or vehicle components of light weight panel sub-assemblies which are high in strength and low in cost such as to be readily expendable and are adaptable for structures for reduced drag.

It is a further object of this invention to provide a panel construction which can be used in a wing assembly for rotary wing aircraft or helicopters in which the boundary layer air control features may be incorporated.

Further and other objects of this invention will be seen from a description of the accompanying drawings in which like numerals refer to like parts. In the drawings:

FIGURE 1 shows a panel construction in accordance with this invention, in which is incorporated structural features to permit boundary layer air control.

FIGURE 2 shows an assembly of panels comparable to those shown in FIGURE 1, in an aircraft or missile wing assembly, adapted for boundary layer air control.

FIGURE 3 is a section taken on the line 3—3 of FIGURE 2.

FIGURE 4 is a view of an assembly of panels in accordance with this invention, showing a fuselage missile or other vehicle, in which may be incorporated drag reducing boundary layer air control.

FIGURE 5 is an enlarged sectional view of the edge of a typical panel showing the feature of boundary layer air control.

The basic panel is shown in FIGURE 1. The typical panel consists of a pair of surface members 2–4, each comprising a pair of sheets 6–8 and 10–12, respectively. The material of these sheets may be fiber glass reinforced plastic or fiber glass reinforced thermosetting resin or any stabilized fiber glass sheet construction which is strong and durable and capable of resisting abrasion and moisture. Each of the surface members, such as 4 consists of a pair of sheets 10–12, having spacer ribs 14 bonded thereto, extending generally parallel to the sides of the sheets to space and lend rigidity to the surface sheets. The spacer strips 14 do not extend to the outer edge of the panel and can be arranged to permit circulation of fluid within the spaced surface sheets. A quadrilateral frame 16, consisting of peripheral members 18, 20, 22, 24 surrounds the surface sheets. The inner edges of these members are slotted as at 26 to receive the sheets. The outer edges of the peripheral members are grooved at 28 and formed to lock with a mating form of interlocking strips 30, as shown in FIGURE 3. The complete unit or complete panel, therefore, consists of the structure shown in FIGURE 1, of the quadrilateral frame with two pairs of surface sheets forming spaced outer surfaces for the panel.

Within the space formed by the spacer elements 14, between the pair of surface sheets, are positioned sleeves 32 which extend through the space formed by the spacer members and through the outer edge of opposed quadrilateral side members of the frame 20, 24. These sleeves 32 may also be of plastic or metal or any suitable material. When assembled in a functional position with other panels, an inner tube 34 extends through and affords a close fit with sleeves 32. Sleeves 32 and tubes 34 are perforated along their lengths so that the holes 36 in tube 34 are in registration with the holes 38 in sleeve 32, when the tubes are oriented in a predetermined position. When tube 34 is connected to a source of fluid pressure, as shown diagrammatically in FIGURES 1 and 5, which fluid pressure can be above or below atmospheric pressure, and the tube 34 oriented so that the holes 36 therein register with the holes 38 in sleeve 32, fluid may be pumped into or removed from the space between the pairs of surface sheets. As will be seen from FIGURE 1, the outer sheet 10 of the pair of spaced surface sheets, can be perforated as at 40, in any pattern so that the fluid adjacent the surface of the panel can be controlled by the pumping of fluid through tubes, and out through the outer surface of the panel, or in the case of a reduced pressure situation, a low pressure can be created adjacent the surface of the panel 10 by the reverse process.

In FIGURE 2 is shown an assembly of such panels with an especially formed, curved, leading-edge panel 42 forming the leading edge of an airfoil or rotary wing. It should be noted, in this instance, that the panels described in FIGURE 1 have the sleeves 32 and tubes 34 extending sparwise thereof and adapted to receive air pressure from a jet engine 46 for pressures in excess of atmospheric pressure or the tubes can be connected on the under side or on the top side to an aspirator 44 located in the jet engine 46 by a suitable valve 48, to have a flow of air on either surface of the airfoil which will generate pressure above or below atmospheric pressure depending upon the position of valve 48 and flow of fluid through the tubes in the panels. Needless to say, the drag of such an airfoil, as shown in FIGURE 2, can be materially reduced by the control of the boundary layer air adjacent the surface of the wing, either above or below the wing, or at the leading edge, through the manipulation of valves 48 which connect the proper areas of the wing to a source of increased or decreased pressure relative to atmospheric pressure.

FIGURE 4 shows a hollow body 50 which may be assembled from panels 16' described above which may form the fuselage of an aircraft or an engine nacelle, or the fuselage of a rocket, where it is desired to reduce drag through the control of boundary layer air. Contouring of such panels will, of course, be adapted to fit the particular requirements as to size and curvature but the construction and operation of the panels, the sleeves and tubes, and the apertures for the ingress and egress of fluid through the tubes connected to the valving mechanisms and sources of pressure over or under atmospheric pressure will be generally the same as described in connection with FIGURE 2. The construction of FIGURE 4 may also be employed where it is desired to have an air cushion or air sustention of a generally cylindrical body in a trough or track to facilitate axial movement of the body along such track.

FIGURE 5 is a sectional view of a typical panel such as shown in FIGURE 1 having the contoured edge strip or frame 20 slotted and adapted to receive the pairs of surface sheets. The interlocking joining strip 30 is shown in place in the edge slot 28 of the frame member. The sleeve 32, perforated at 36 to permit the egress or ingress of fluid, is shown in place between the pairs of surface sheets 10–12 extending through the outer frame 20 to facilitate interconnection with other panels. The slotted tube 34, which acts as a conduit for fluid pressure from the source of the fluid pressure, also acts as a valving mechanism by reason of its relative position, either longitudinal or rotary, with respect to the fixed sleeve 32 mounted in the panel. In the outer surface 10 of one of the pairs of surface sheets 4, holes 40 are formed which may be either normal to the surface or at an angle to the surface for the ingress or egress of fluid through the space between the pair of surface sheets 10–12.

Returning to FIGURE 1, as exemplary of all of the panel constructions intended to be employed in this invention, fastening means 52 are shown on the surface, which may be rivets or bolts, depending upon the strength requirements to secure the assembly into a unitary construction. It is also contemplated that with some materials, such as plastic materials, the assembly may be bonded by adhesives.

It is contemplated that standardization or simplification of tooling will be permitted by this construction. The edge members 18–24 can be extrusions of any suitable material. Likewise, the spacer strips 14 and members 32, 34, as well as the interlocking strips 30 can be extrusions of any suitable material, depending upon the strength required.

The operation of such a panel construction from the foregoing should be clear from the description of the panel per se and the applications of the panel to the several described assembly constructions. The essential features are that the panel is of low cost, lightweight, easy-to-assemble construction, and that tubing sleeves 32 are preformed and inserted in the panel which, together with the smaller tubing 34 which is inserted in the sleeves, affords a through passage through an assembly of panels for the conduction of fluid with suitable apertures in the sets of the sleeves and the tubes. Valving may be accomplished by the movement of the apertures in the tube with respect to the apertures in the sleeve within each panel. Other valving will be required at the source of fluid pressure, whether it is above or below atmospheric pressure, to insure that the desired boundary layer control of the air at the surface of the panel is effected.

It should be apparent from the foregoing description that standard panels can be prefabricated and assembled in a variety of ways with a minimum of rework to accomplish control of the surface air pressure on the boundary of an assembly of panels placed together in a design to effect a predetermined result.

A construction of the type described above affords the boundary layer air control for blades, such as helicopter blades, that has not heretofore been possible, due to the small dimensions of such rotary airfoils, as well as affording boundary layer air control to decrease drag on missiles while in the atmosphere, with a minimum of moving parts or auxiliary power plants. It is to be understood that certain changes, modifications, alterations and substitutions may be made without departing from the spirit and scope of the appended claims.

What is claimed is:

1. A panel construction for vehicle components comprising a plurality of panels placed edge to edge, each of the panels consisting of a pair of surface members, each of said pair of surface members comprising a pair of sheets having spacing members therebetween, the edges of such sheets secured to the inside edges of a frame, such outer edges of said frame having grooves formed therein and an interlocking strip between adjacent panels interlocking said edge grooves thereof to form a unitary assembly, apertured sleeves extending within the space between said pair of surface members and extending through said frame, flow control tubes extending through an assemblage of a plurality of said panels, having apertures formed therein which may be moved into registration with the apertures in said sleeves and means to connect said flow control tubes to a controlled source of fluid pressure and means to move said flow control tubes in said panel assembly for the control of fluid through the space formed by said pair of surface members and aperture means formed in the outer surface member of said pair of surface members in the assembly for the control of fluid pressure adjacent the outer surface of said panel construction.

2. A panel construction for a vehicle component comprising a plurality of panels placed edge to edge, each of said panels consisting of a pair of surface members, each of said surface members comprising a pair of sheets having spacing members therebetween, the edges of said sheets secured to the inside edges of a frame, the outer edges of said frame having grooves formed therein and an interlocking strip between adjacent panels interlocking with the edge grooves thereof to form a unitary structure, an apertured sleeve extending through said construction and a tube mounted for movement within said apertured sleeve, means connecting said tube to a source of fluid pressure, said tube being apertured and extending the length of the sleeve so that by movement of the tube within the sleeve, holes in the tube and sleeve can be brought into greater or less registration for the control of fluid flow therethrough.

3. A panel construction for vehicle subassemblies comprising a plurality of panels placed edge to edge, each of said panels consisting of a pair of surface members, each of said surface members comprising a pair of sheets having spacing members therebetween, the edges of said sheets secured to the inside edges of a frame, and a strip between adjacent panels interlocking with the edges thereof to form a unitary panel structure, an apertured sleeve extending through said construction and a tube mounted for movement within said apertured sleeve, means connecting said tube to a source of fluid pressure, said tube being apertured and extending the length of the sleeve so that by movement of the tube within the sleeve, holes in the tube and sleeve can be brought into greater or less registration for the control of fluid flow therethrough.

4. A panel construction for vehicle subassemblies according to claim 2, in which the individual panels are curved to conform to the contour of said subassembly.

5. A panel construction for vehicle subassemblies according to claim 1, in which said sheets of said surface members are fiber glass reinforced thermosetting resin.

6. A panel construction for vehicle subassemblies according to claim 1, in which said sheets of said surface members are fiber glass reinforced plastic.

7. A panel construction for vehicle subassemblies according to claim 1, in which said frame consists of extruded members each having the inner edge thereof formed to receive and engage the edges of said sheets and the outer edge thereof formed to interlock with said interlocking strip.

8. A panel construction for vehicle subassemblies according to claim 1, in which the sheets of the surface members are stabilized fiber glass construction.

9. A panel assembly for vehicle wing construction comprising a plurality of similar panels placed edge to edge to form a spanwise strip, each of said panels consisting of a pair of surface members, each of said surface members comprising a pair of sheets having spacing members therebetween, the edges of said sheets secured to the inside edges of a frame, a strip member between adjacent edges of said panel formed to interlock with the edges thereof, said strip extending chordwise for the full length of the edge of said panel, other strip members extending longitudinally of said spanwise strip of panels and interlocking therewith to secure a plurality of strips of panels together in interlocking relationship to form a unitary wing panel construction, an apertured sleeve extending through said construction and a tube mounted for movement within said apertured sleeve, means connecting said tube to a source of fluid pressure, said tube being apertured and extending the length of said sleeve so that by movement of said tube within said sleeve holes in said tube and said sleeve can be brought into greater or less registration for the control of fluid flow therethrough.

10. A panel assembly according to claim 9 in which said panels are curved to conform to the contour of said wing construction.

References Cited by the Examiner

UNITED STATES PATENTS

| | | | |
|---|---|---|---|
| 2,440,198 | 4/48 | Green | 244—40 |
| 2,833,492 | 5/58 | Fowler | 244—40 |
| 2,841,182 | 7/58 | Scala | 244—42 |

FERGUS S. MIDDLETON, *Primary Examiner.*